United States Patent
Moore

(10) Patent No.: US 9,828,158 B2
(45) Date of Patent: Nov. 28, 2017

(54) PACKAGING FOR VISUALLY IMPAIRED AND BLIND PERSONS

(71) Applicant: Toyota Motor Engineering & Manufacturing North America, Inc., Erlanger, KY (US)

(72) Inventor: Douglas A. Moore, Livermore, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 154 days.

(21) Appl. No.: 14/243,928

(22) Filed: Apr. 3, 2014

(65) Prior Publication Data

US 2015/0287343 A1    Oct. 8, 2015

(51) Int. Cl.
*G09B 21/00* (2006.01)
*B65D 77/02* (2006.01)
(Continued)

(52) U.S. Cl.
CPC .......... *B65D 77/02* (2013.01); *B65D 5/4212* (2013.01); *B65D 77/042* (2013.01);
(Continued)

(58) Field of Classification Search
CPC .. G09B 21/006; G09B 21/007; B65D 25/205; B65D 2577/047; B65D 77/02;
(Continued)

(56) References Cited

U.S. PATENT DOCUMENTS 5,464,092 A * 11/1995 Seeley ................ B65D 5/4291
 206/217
6,084,511 A * 7/2000 Kil ........................ G08B 13/08
 340/545.6
(Continued)

FOREIGN PATENT DOCUMENTS

| JP | 11292091 | 10/1999 |
| JP | 2011184076 | 9/2011 |
| WO | 2012155091 | 11/2012 |

OTHER PUBLICATIONS (Unauthored), Blind Citizens Australia Submission: TGA Medicine Labelling and Packaging Review, Therapeutic Goods Administration, Woden, Australia, Aug. 24, 2012.

*Primary Examiner* — Zhen Y Wu
(74) *Attorney, Agent, or Firm* — Dinsmore & Shohl LLP

(57) ABSTRACT

Packaging for visually impaired and blind user is disclosed. In one embodiment, a package includes an exterior surface, a first sub-component package, and a second sub-component package. The first sub-component package and the second sub-component package are enclosed by the exterior surface in an interior region of the package. The package further includes a first non-visual message element associated with the first sub-component package, and a second non-visual message element associated with the second sub-component package. The non-visual message elements may be configured as tactile and/or audio non-visual message elements. In some embodiments, wireless signal emitter devices are provided within the package to actuate one or more speaker devices to thereby play auditory signals.

18 Claims, 8 Drawing Sheets

(51) Int. Cl.
    *B65D 77/04*     (2006.01)
    *B65D 5/42*     (2006.01)

(52) U.S. Cl.
    CPC ....... B65D 77/0453 (2013.01); G09B 21/007 (2013.01); *B65D 2203/02* (2013.01)

(58) Field of Classification Search
    CPC ................ B65D 5/4212; B65D 77/042; B65D 77/0453; B65D 2203/02
    USPC ....................................................... 340/4.14
    See application file for complete search history.

(56) References Cited

U.S. PATENT DOCUMENTS

| | | | |
|---|---|---|---|
| 6,287,671 B1* | 9/2001 | Bright | B65C 3/16 156/84 |
| 7,422,105 B2 | 9/2008 | Loyd et al. | |
| 8,020,702 B2 | 9/2011 | Strub et al. | |
| 8,249,889 B2 | 8/2012 | Lyons et al. | |
| 2003/0070947 A1* | 4/2003 | Motson | A45F 5/00 206/320 |
| 2004/0061677 A1* | 4/2004 | Hejza Litwiller | G06F 3/011 345/156 |
| 2005/0166864 A1* | 8/2005 | Zhurin | B65D 25/00 119/707 |
| 2008/0135437 A1* | 6/2008 | Taneri | B65D 5/4212 206/459.1 |
| 2008/0312957 A1* | 12/2008 | Luciano, Jr. | A61J 7/0069 705/2 |
| 2009/0128330 A1* | 5/2009 | Monroe | A61B 90/98 340/568.1 |
| 2009/0184023 A1* | 7/2009 | Brollier | A61J 1/035 206/531 |
| 2010/0075641 A1* | 3/2010 | Schwartz | H04L 12/5895 455/414.1 |
| 2012/0024889 A1* | 2/2012 | Robertson | A61B 5/0002 222/23 |
| 2012/0312714 A1* | 12/2012 | Luciano | A61J 7/0084 206/534 |
| 2013/0071817 A1* | 3/2013 | White | G09B 21/004 434/113 |
| 2013/0307683 A1* | 11/2013 | Greenberg | A47G 19/2227 340/539.1 |
| 2013/0332827 A1* | 12/2013 | Smith | G06F 3/016 715/702 |

* cited by examiner

PACKAGING FOR VISUALLY IMPAIRED AND BLIND PERSONS

TECHNICAL FIELD

The present specification generally relates to packaging and, more particularly, packaging for visually impaired and blind persons.

BACKGROUND

Currently, some products are disposed in packaging designed to provide an enjoyable unboxing experience. For example, a product may comprise several sub-components that are creatively packaged and arranged in a visually pleasing manner. The sub-components may be hierarchically arranged such that excitement will build in the person opening the package as he or she reaches deeper layers within the package. Therefore, products may be packaged in an engaging and interesting way. This allows the user to have fun opening the package and discovering what is inside. Further, additional information may be provided within the package for a step-by-step process for opening the package.

However, visually impaired or blind users may not have the opportunity to enjoy the same unboxing experience of products as those capable of seeing. Accordingly, packages capable of providing an enjoyable unboxing experience for visually impaired and blind users are desired.

SUMMARY

In one embodiment, a package includes an exterior surface, a first sub-component package, and a second sub-component package. The first sub-component package and the second sub-component package are enclosed by the exterior surface in an interior region of the package. The package further includes a first non-visual message element associated with the first sub-component package, and a second non-visual message element associated with the second sub-component package.

In another embodiment, a package includes an exterior surface and a sub-component package. The first sub-component package is enclosed by the exterior surface in an interior region of the package. The package further includes a first wireless signal emitter device and a second wireless signal emitter device, wherein each of the first and second wireless signal emitter devices is configured to emit a wireless signal, and at least one of the first and second wireless signal emitter devices are disposed within the interior region of the package.

In yet another embodiment, a package includes an exterior surface and a sub-component package. The sub-component package is enclosed by the exterior surface in an interior region of the package. The package further includes a first tactile non-visual message element associated with the exterior surface, a second tactile non-visual message element associated with the sub-component package, and a first audio non-visual message element, wherein the first audio non-visual message element is configured to produce one or more auditory signals upon opening of a portion of the exterior surface.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments of the present disclosure are directed to packaging configured to enhance an unboxing experience for visually impaired and blind users. More specifically, embodiments of the present disclosure utilize non-visual message elements on exterior and interior surfaces of the package to provide information that enhances the unboxing experience. Example non-visual message elements may be configured as audio messages, haptic messages, tactile messages (e.g., Braille or embossed regions in a substrate), and the like. By providing non-visual message elements at various layers of a package, the experience of the user (e.g., a visually impaired or blind user) may be more informative and enjoyable. For example, the excitement experienced by the user may increase as he or she opens each additional enclosure within the package. Various embodiments of packages incorporating non-visual message elements are described and illustrated herein.

Figure 1A:
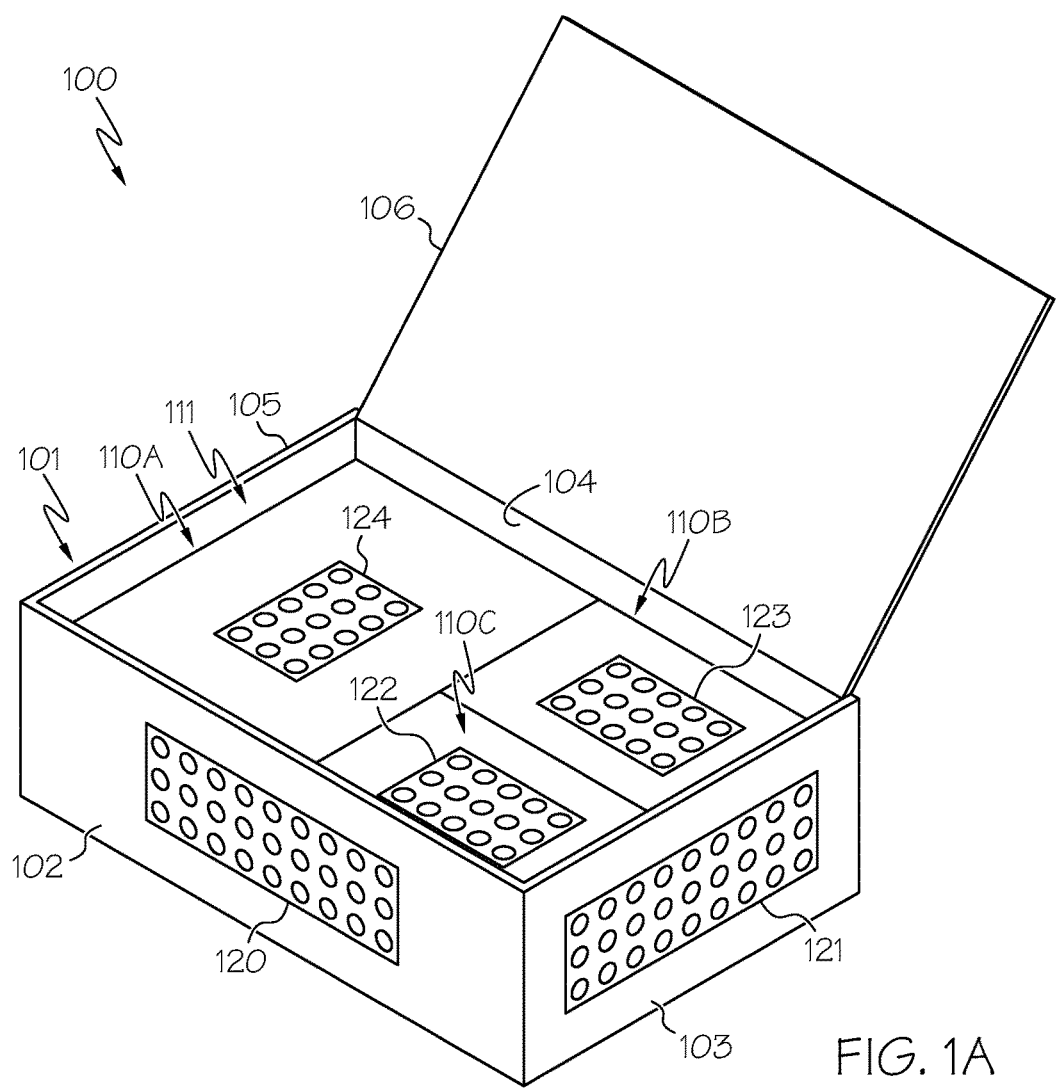
FIG. 1A schematically depicts a package with tactile non-visual message elements according to one or more embodiments described and illustrated herein.
Figure 1B:
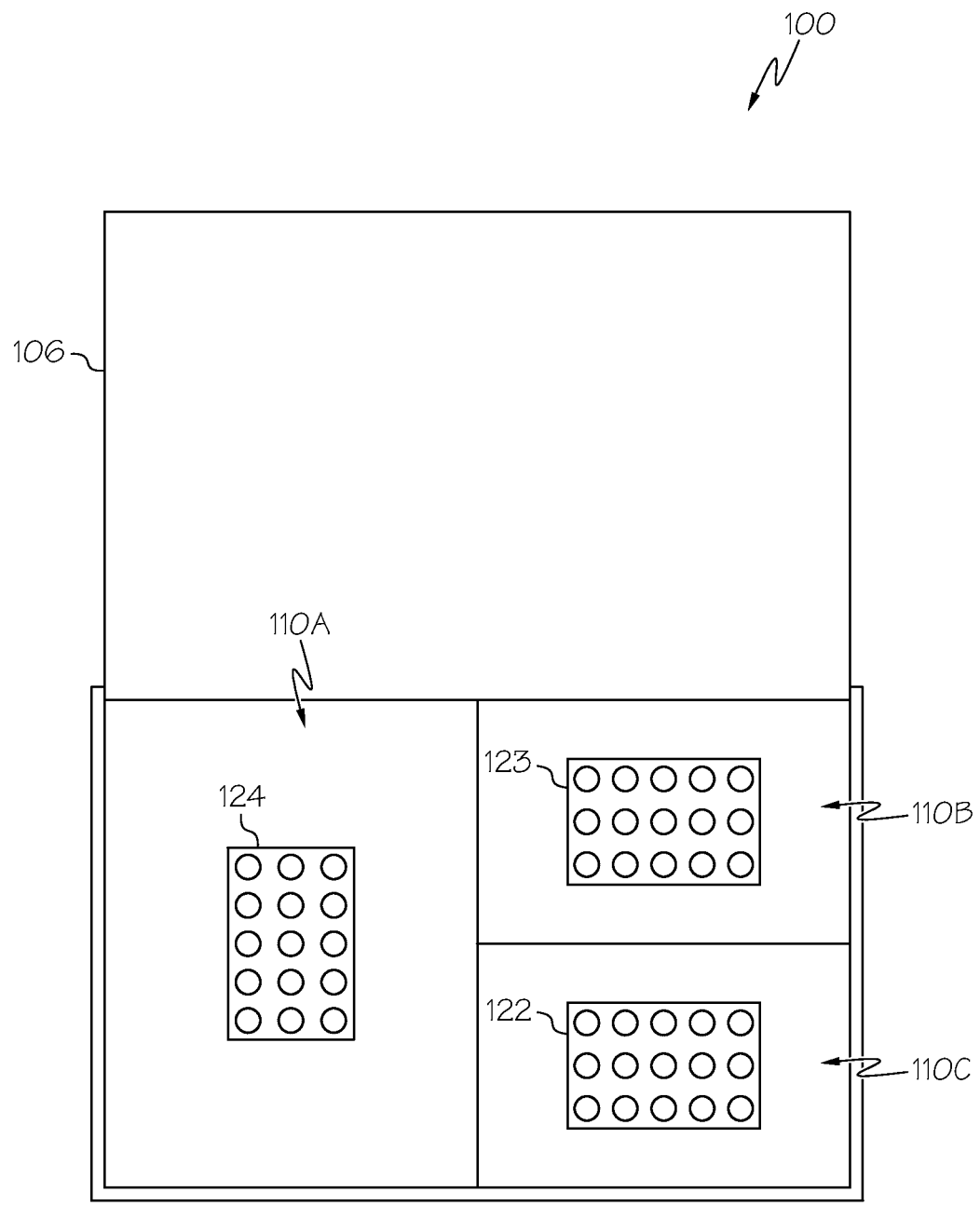
FIG. 1B schematically depicts a top view of the package depicted in FIG. 1A.

FIGS. 1A and 1B depict an example package 100 that encloses several sub-component packages. FIG. 1A is a perspective view of an opened package 100, while FIG. 1B is a top view of the opened package 100 depicted in FIG. 1A. In the illustrated embodiment, the package 100 encloses three sub-component packages in an interior region: a first sub-component package 110A, a second sub-component package 110B, and a third sub-component package 110C. It should be understood that any number of sub-component packages may be enclosed by the package 100.

The example package 100 has an exterior surface 101 defined by exterior walls 102, 103, 104 and 105, as well as floor wall 107 (see FIG. 3) and top wall 106. It should be understood that embodiments of the present disclosure are not limited to the shape and configuration of the walls depicted in FIGS. 1A and 1B. For example, the package 100 may have a spherical shape, triangular shape, hexagonal shape, or the like.

Figure 3:
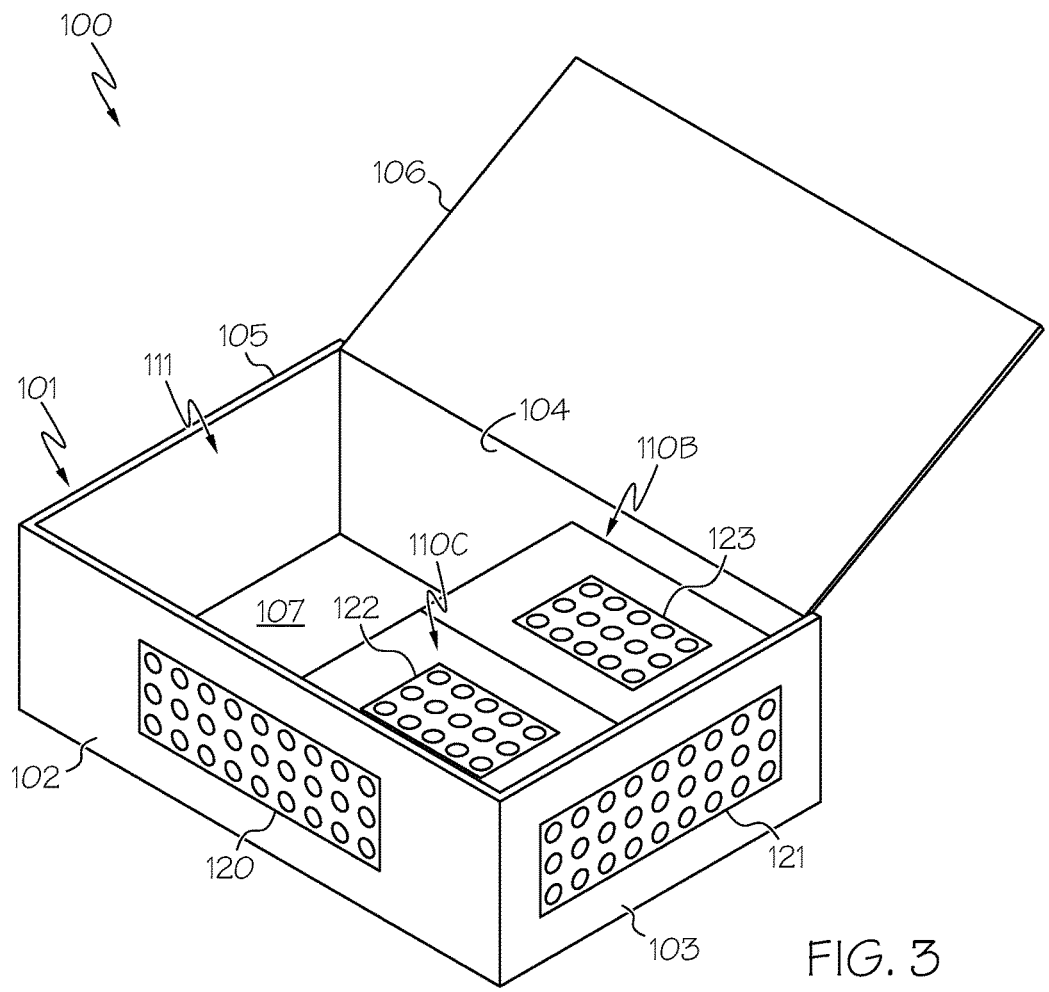
FIG. 3 schematically depicts the package depicted in FIGS. 1A and 1B with a sub-component package removed.

The sub-component packages 110A-110C may have exterior walls or surfaces that enclose one or more sub-components that define the overall product enclosed by the package. The product may be any type of product such as, without limitation, a cellular phone and accessories, a computer, a media player, a toy, or a tool. Referring briefly to FIG. 3, the first sub-component package 110A encloses a first sub-component 117, which in the illustrated embodiment is a cellular phone. As an example and not a limitation, the second sub-component package 110B may enclose headphones and the third sub-component package 110C may enclose a charging device.

The exterior walls 102-107 of the package 100 as well as the walls of the sub-component packages 110A-110C may be made from any suitable substrate material such as, without limitation, cardboard or plastic.

Referring to FIGS. 1A and 1B, the exterior surface 101 of the package 100 may include one or more non-visual message elements, such as non-visual message element 120 and non-visual message element 121. It should be understood that any number of non-visual elements may be disposed on the exterior surface 101 of the package 100. For example, one or more non-visual message elements may be provided on wall 105 and/or top wall 106.

Non-visual message elements may also be associated with one or more of the sub-component packages 110A-110C enclosed within the package. In the illustrated embodiment, non-visual message element 124 is disposed on a top surface of the first sub-component package 110A, non-visual message element 122 is disposed on a top surface of the third sub-component package 110C, and non-visual message element 123 is disposed on the second sub-component package 110B. It should be understood that any number of non-visual message components may be provided on any number of surfaces of the sub-component packages 110A-110C.

FIGS. 1A and 1B schematically depict an embodiment wherein the various non-visual message elements 120-124 are configured to provide tactile messages. It should be understood that the circular shapes within the non-visual message elements are for illustrative purposes only, and that they schematically depict any type of tactile message, including, but not limited to, Braille messages and/or shapes embossed on the exterior surface 101 of the package 100 or the sub-component packages 110A-110C, or on a substrate that is coupled to the exterior surface 101 of the package 100 or the sub-component packages 110A-110C.

As stated above, the tactile non-visual message elements 120-124 may provide various messages regarding the package 110 and/or the sub-component packages 110A-110C enclosed by the package 100. The messages may provide any type of information regarding the enclosed product or even information outside of the scope of the product. As non-limiting examples, the information provided by the various tactile non-visual message elements 120-124 (as well as the audio non-visual message elements illustrated in FIGS. 5-13 and described below) may provide instructions regarding how to open the package 100 and sub-component packages 110A-110C, information regarding the location of the various sub-component packages 110A-110C within the package 100, information regarding which sub-component package 110A-110C to open next, information regarding what sub-component is enclosed by a particular sub-component package 110A-110C, information regarding how to use the sub-component enclosed by a particular sub-component package 110A-110C, information regarding how to assemble various sub-components enclosed by the sub-component packages 110A-110C, information generally regarding the technology of the product enclosed by the package 100, marketing information, and information to set the mood for the unboxing experience (e.g., a fictional narrative to prompt the user to use his or her imagination while unboxing the product). It should be understood that other types of information may be provided by the tactile non-visual message elements 120-124 and the other non-visual message elements described below.

Figure 2:
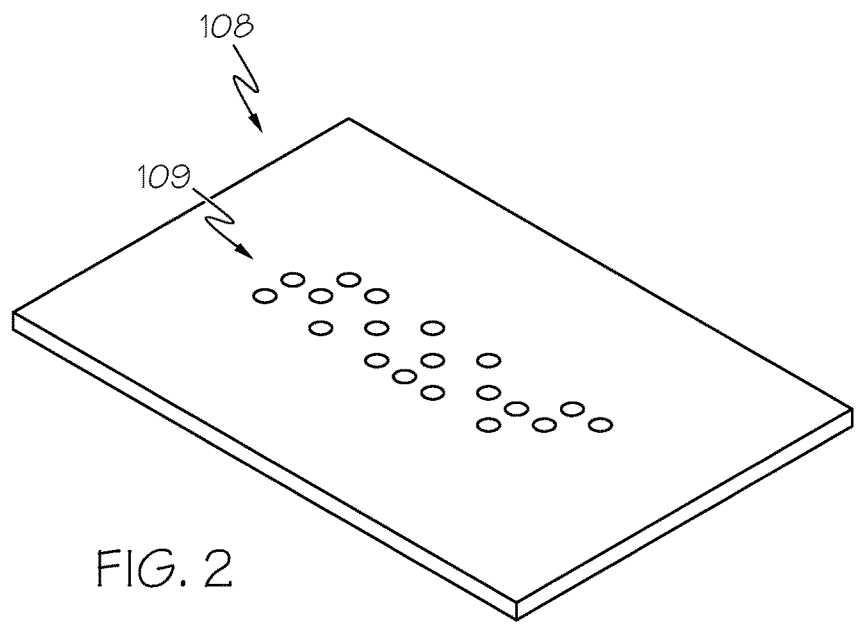
FIG. 2 schematically depicts a loose substrate with a tactile non-visual message element for inclusion in a package according to one or more embodiments described and illustrated herein.

Referring now to FIG. 2, in some embodiments a loose substrate 108 may be disposed within the interior region enclosed by the walls 102-107. The loose substrate 108 may include a tactile non-visual message 109 that provides information relating to the package 100 and the product and sub-components of the product enclosed therein. The loose substrate may be made from any type of material, such as paper, paperboard, plastic, and the like.

The tactile non-visual message 109 may include Braille or other tactile message means. For example, Braille may be embossed in a surface of the loose substrate 108. The tactile non-visual message 109 may provide one or more of the information types describe above, or any other type of information. In one embodiment, the tactile non-visual message 109 provides an overview of the sub-components and the sub-component packages 110A-110C enclosed by the package 100.

A non-limiting example unboxing experience will now be described with reference to FIGS. 1A-4. It should be understood that embodiments are not limited to the particular example unboxing experience described below.

Referring initially to FIG. 1A, a user (e.g., a visually impaired or blind user) may pick up the package 100 with his or her hands and find tactile non-visual message elements 120 and 121. Tactile non-visual message element 120 may provide an overview or general description of the product enclosed by the package 100, while tactile non-visual message element 121 may provide instructions on how to open the package 100. For example, tactile non-visual message element 121 may provide information regarding where the tab is located to lift the top wall 106 the package 100 to expose the interior region of the package 100.

The loose substrate 108 depicted in FIG. 2 may be positioned on top of the sub-component packages 110A-110C depicted in FIGS. 1A and 1B. The user may pick up the loose substrate 108 and feel the tactile non-visual message 109 provided thereon. The tactile non-visual message 109 may provide a map that describes the locations of the sub-component packages 110A-110C. Other information may also be provided by the tactile non-visual message 109.

After removing the loose substrate 108 from the package 100, the sub-component packages 110A-110C and tactile non-visual message elements 122-124 are exposed and accessible to the user. The tactile non-visual message 109 provided on loose substrate 108 may have instructed the user to find the left-most sub-component package 110A first. As an example, the left-most sub-component package 110A may enclose the main sub-component of the product.

The user may feel tactile non-visual message element 124 when grasping the left-most sub-component package 110A. Tactile non-visual message element 124 may provide information regarding the sub-component enclosed by the left-most sub-component package 110A to describe the sub-component as well as build excitement for the user prior to and during the opening the left-most sub-component package 110A.

FIG. 3 schematically depicts the package 100 after removal of the left-most sub-component package 110A from the interior region 111. Removal of the left-most sub-component package 110A may expose the floor wall 107, or, in other embodiments, another sub-component package (not shown) in a lower layer/level within the interior region 111 of the package 100.

Figure 4:
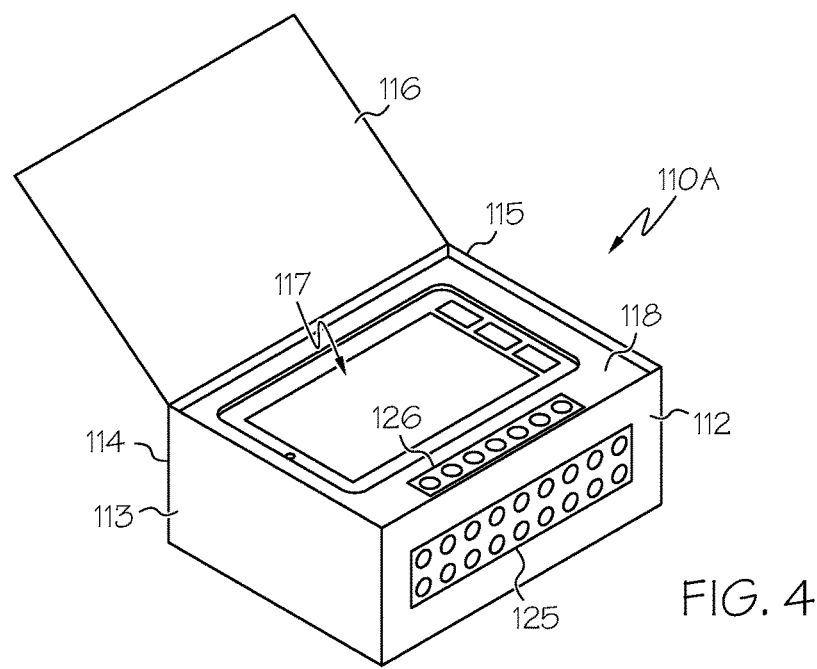
FIG. 4 schematically depicts a sub-component package having tactile non-visual message elements in an opened state according to one or more embodiments described and illustrated herein.

FIG. 4 schematically depicts the left-most sub-component package 110A in an opened state. The left-most sub-component package 110A has several walls 112-116, and further includes tactile non-visual message element 125 disposed on wall 112, and tactile non-visual message element 126 disposed on a packaging surface 118. The packaging surface 118 is configured to maintain sub-component 117 (which is a cellular phone in the illustrated embodiment) within the left-most sub-component package 110A. Tactile non-visual message element 125 may provide information regarding the sub-component 117 and/or how to open the left-most sub-component package 110A. Tactile non-visual message element 126 may provide additional information describing the sub-component 117 to increase the excitement in unboxing the sub-component, for example.

A similar unboxing process as described above may be provided for the remaining sub-component packages 110B and 110C, as well as any additional sub-component packages that may be enclosed. In this manner, the tactile non-visual message elements associated with the package may enhance the unboxing experience for visually impaired and blind users.

Figure 5:
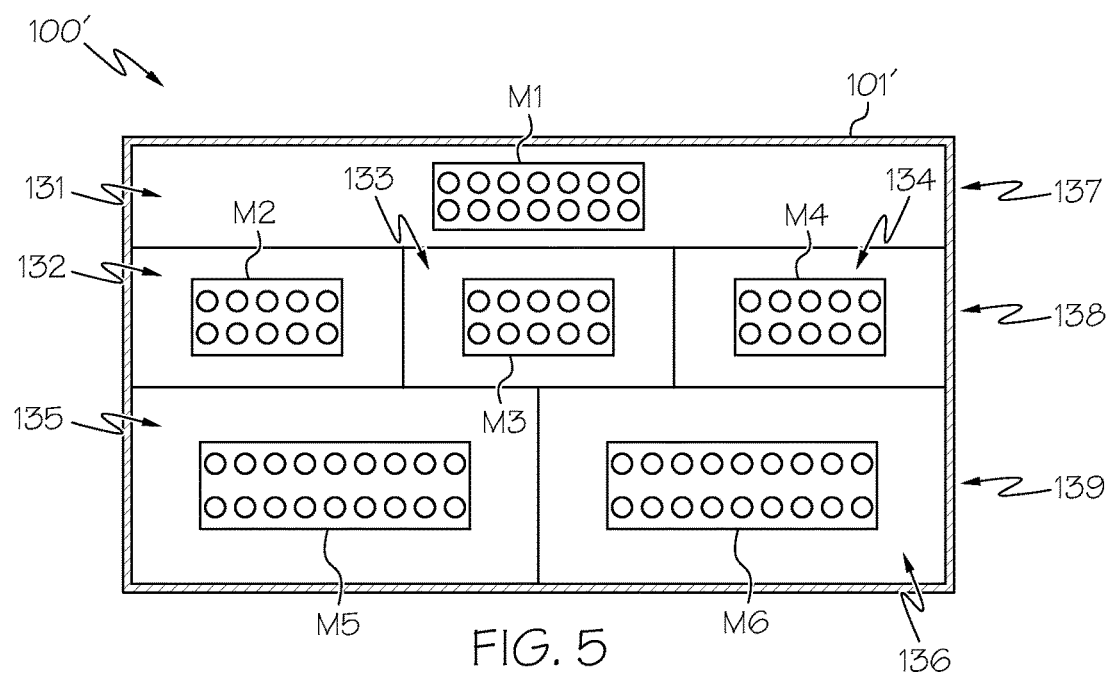
FIG. 5 schematically depicts a hierarchal arrangement of sub-component packages and non-visual message elements within a package according to one or more embodiments described and illustrated herein.

FIG. 5 is a side, sectional view of a package 100' wherein various sub-component packages 131-136 are hierarchically arranged in first, second, and third layers 137, 138, and 139. Each sub-component package 131-136 may include one or more non-visual message elements M1-M6. It should be understood that any number of sub-component packages 131-136 may be provided in any number of hierarchical layers, and each sub-component package 131-136 may include more than one non-visual message element.

As an example and not a limitation, a first non-visual message element M1 is disposed on a highest-level sub-component package 131. In the illustrated embodiment, the highest layer 137 includes only a single sub-component package 131. The first non-visual message element M1 may provide information regarding a sub-component enclosed by the highest-level sub-component package 131. A second layer 138 within the package 100' includes three sub-component packages 132, 133 and 134, each of which have a non-visual message element M2, M3, and M4 associated therewith. Any one (or more) of the non-visual message elements M2, M3, and M4 may provide information regarding the sub-components that are disposed within the second layer 138 by the three sub-component packages 132, 133 and 134. Additionally, one (or more) of the non-visual message elements M2, M3 and M4 may include information regarding the sub-components disposed within the third layer 139.

The third layer 139 has two sub-component packages 135 and 136 disposed therein. The sub-component packages 135 and 136 include non-visual message elements M5 and M6, respectively. Either or both of the non-visual message elements M5 and M6 may include information regarding the sub-components disposed within sub-component packages 135 and 136.

By arranging the sub-component packages in a hierarchical manner, and providing information regarding the sub-components in each level, a user may become more excited to open the sub-component packages at each level.

Figure 6:
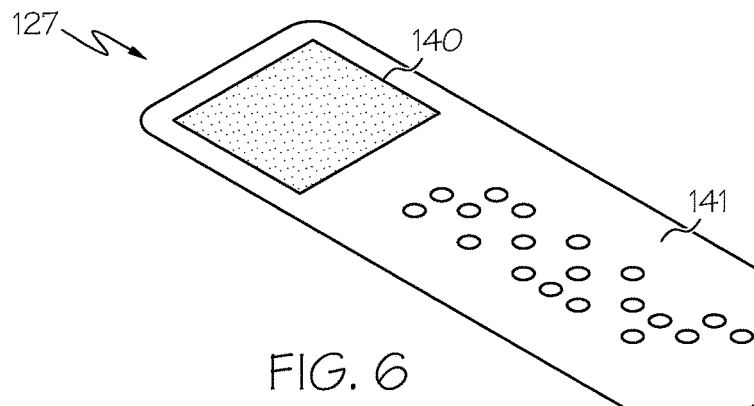
FIG. 6 schematically depicts a tactile non-visual message element including Braille according to one or more embodiments described and illustrated herein.
Figure 7:
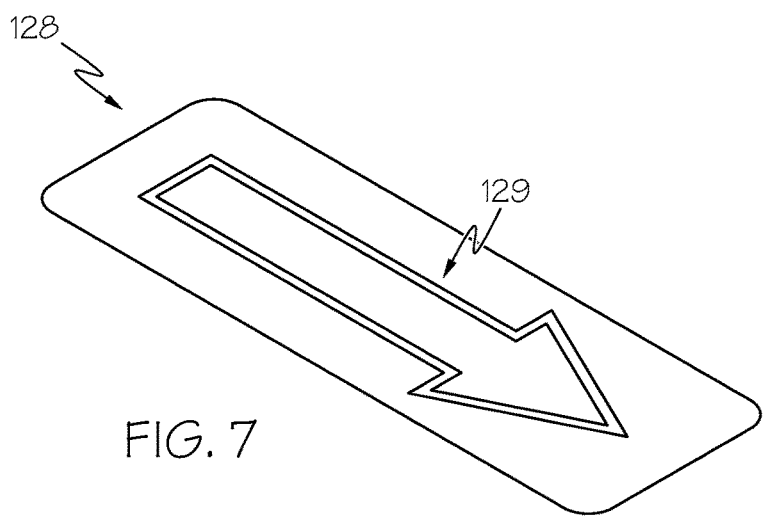
FIG. 7 schematically depicts a tactile non-visual message element including an embossed shape according to one or more embodiments described and illustrated herein.

The tactile non-visual message elements described herein may take on any configuration. FIGS. 6 and 7 schematically depict two example tactile non-visual message elements. The tactile non-visual message element 127 includes first region 140 and a second region 141. The first region 140 may have a texture that indicates to the user that a tactile message is located nearby in the second region 141. The texture of the first region 140 may be any type of texture, such as a rough texture, a fuzzy texture, a scaly texture, a smooth texture, and the like. Further, the first region 140 may be configured in any geometrical shape.

The second region 141 is positioned in close proximity to the first region 140 in the illustrated embodiment. The second region 141 may be positioned on any side of the first region 140. The second region 141 may provide any tactile message, such as those tactile messages described above (e.g., information regarding the enclosed sub-component, information regarding sub-components within a level of the packaging, marketing information, and the like).

The illustrated tactile non-visual message element 127 is depicted as a tag that may be coupled to a surface of the exterior surface of a package or sub-component, or loosely disposed in the package or a sub-component package. The tactile non-visual message element 127 may be coupled to a target surface by adhesive, for example. Other coupling means may also be utilized. In some embodiments, the tactile non-visual message element 127 is integral with the wall of the package or sub-component package and not a separate component.

FIG. 7 depicts another example tactile non-visual message element 128. The illustrated tactile non-visual message element 128 has an embossed arrow shape 129 that may be felt by a user to provide directional information to the user. For example, the embossed arrow shape 129 may direct a user to another tactile non-visual message element, a tab to open the package or sub-component package, or some other location. Shapes other than an arrow may be used. As described above with respect to the tactile non-visual message element 126 depicted in FIG. 6, the tactile non-visual message element 127 may be configured as a tag that is applied to a surface, or may be integral with a wall of the package or sub-component package.

Embodiments of the present disclosure may also utilize auditory signals in lieu of, or in conjunction with, the tactile non-visual message elements described above. As described in more detail below, the auditory signals may provide information with respect to the enclosed product as well as musical accompaniment and/or sounds.

Embodiments may employ any type of speaker device and actuator device to produce the desired auditory signals. FIGS. 8-13 schematically illustrate several embodiments for producing auditory signals. It should be understood that embodiments of the present disclosure are not limited to the embodiments depicted in FIGS. 9-13.

Figure 8:
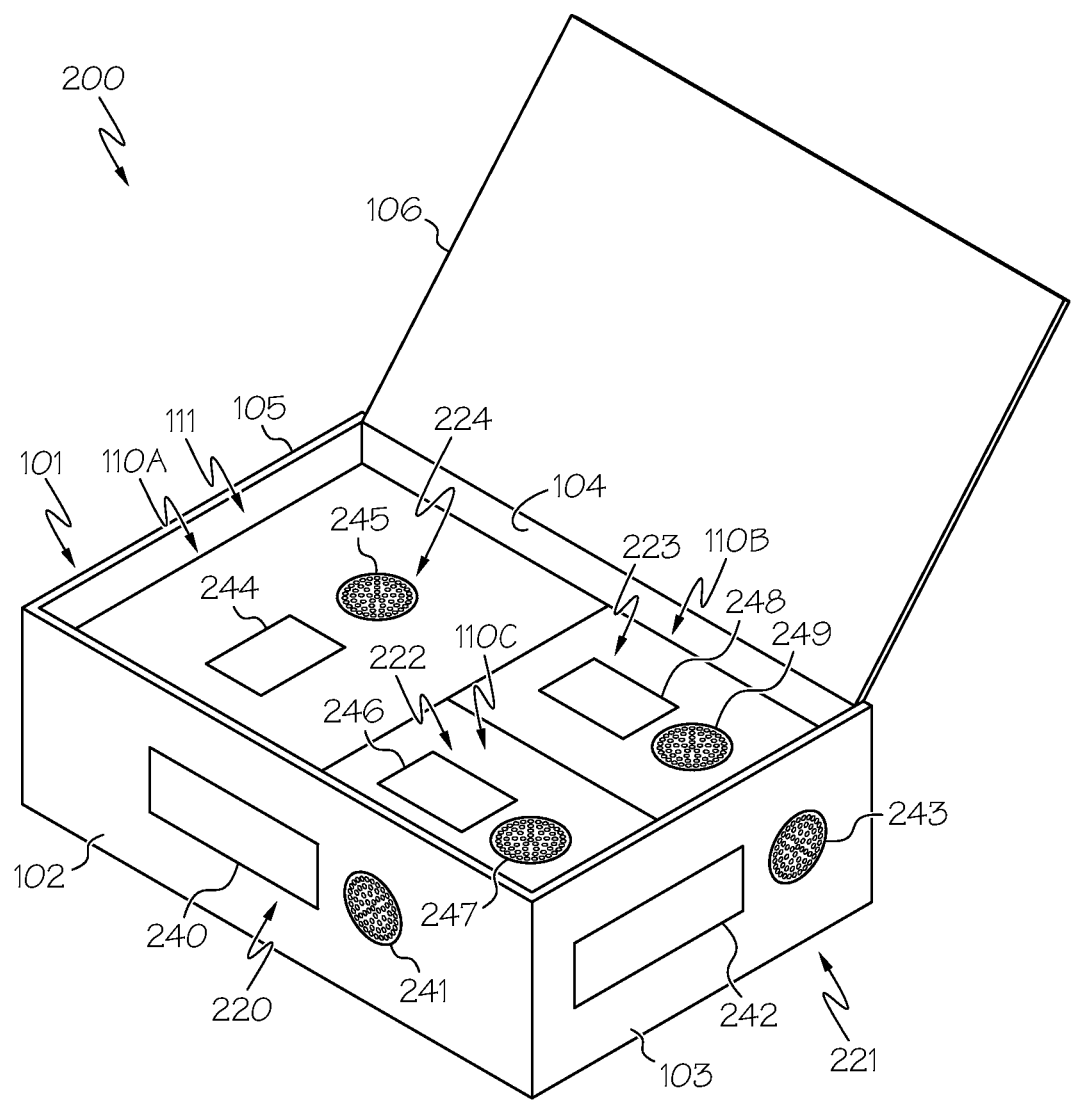
FIG. 8 schematically depicts a package with audio non-visual message elements according to one or more embodiments described and illustrated herein.

Referring now to FIG. 8, an example package 200 configured to produce auditory signals is schematically depicted. The package 200 includes the example walls 102-109 and sub-component packages 110A-110C depicted in FIGS. 1A, 1B, and 3. In the illustrated embodiment, audio non-visual message elements are associated with an exterior surface of the package 200, as well as one or more of the sub-component packages 110A-110C enclosed within the package 200.

The exterior surface 101 of the package 200 may include one or more audio non-visual message elements, such as audio non-visual message element 220 and audio non-visual message element 221. It should be understood that any number of audio non-visual elements may be disposed on the exterior surface 101 of the package 100. For example, one or more non-visual message elements may be provided on wall 105 and/or top wall 106. It should also be understood that any of the audio non-visual message elements illustrated and described herein may also be used in conjunction with tactile non-visual message elements.

In the illustrated embodiment, audio non-visual message element 224 is disposed on a top surface of the first sub-component package 110A, audio non-visual message element 222 is disposed on a top surface of the third sub-component package 110C, and audio non-visual message element 223 is disposed on the second sub-component package 110B. It should be understood that any number of audio non-visual message components may be provided on any number of surfaces of the sub-component packages 110A-110C.

The audio non-visual message elements may comprise a speaker device and an actuation device. As shown in FIG. 8, audio non-visual message element 220 includes a speaker device 241 and an actuator device 240. Similarly, audio non-visual message element 221 includes speaker device 243 and actuation device 242, audio non-visual message element 222 includes speaker device 247 and actuation device 246, audio non-visual message element 223 includes a speaker device 249 and an actuation device 248, and audio non-visual message element 224 includes a speaker device 245 and an actuator device 244.

Each of the speaker devices may be configured as a speaker capable of producing the desired auditory signal. Although not depicted in FIG. 8, each of the speaker devices may include a power source (e.g., a battery) as well as a memory storage device capable of storing an audio file that contains the auditory signal. Additional circuitry may also be provided to produce the desired auditory signal from the speaker device.

Although the illustrated speaker devices 241, 243, 245, 247 and 249 are shown as being visible, embodiments are not limited thereto. For example, the speaker devices 241, 243, 245, 247 and 249 may be embedded in the various walls and not visible to the user.

Each of the actuator devices is configured to cause the desired auditory signal(s) to be emitted from the speaker device to which it is associated. For example, actuator device 240 is configured to cause speaker device 241 to emit one or more desired auditory signals. Therefore, the actuator devices are electrically (either by wired or wireless connections) to their respective speaker devices. The actuator devices may be configured as any type of switch or actuator, including, but not limited to, momentary switches, contact switches, touch-sensitive switches, light switches, light sensors, pressure sensors, and rotary switches. It should be understood that other types of actuator devices may be utilized.

As stated above, the audio non-visual message elements 220-224 may provide various auditory signals regarding the package 200 and/or the sub-component packages 110A-110C enclosed by the package 200. The auditory signals may provide any type of information regarding the enclosed product or even information outside of the scope of the product. As non-limiting examples, the information provided by the various audio non-visual message elements 220-224 may provide instructions regarding how to open the package 200 and sub-component packages 110A-110C, information regarding the location of the various sub-component packages 110A-110C within the package 200, information regarding which sub-component package 110A-110C to open next, information regarding what sub-component is enclosed by a particular sub-component package 110A-110C, information regarding how to use the sub-component enclosed by a particular sub-component package 110A-110C, information regarding how to assemble various sub-components enclosed by the sub-component packages 110A-110C, information generally regarding the technology of the product enclosed by the package 200, marketing information, and information to set the mood for the unboxing experience (e.g., a fictional narrative to prompt the user to use his or her imagination while unboxing the product). It should be understood that other types of information may be provided by the audio non-visual message elements 220-224 and the other non-visual message elements described below.

Further, one or more of the audio non-visual message elements 220-224 may be configured to play musical accompaniment and/or sounds to make the unboxing experience a more pleasurable one. One or more of the audio non-visual message elements 220-224 may also be configured to play musical accompaniment and/or sounds in conjunction with spoken words regarding the types of information described above. In some embodiments, one or more of the audio non-visual message elements 220-224 may store personal message recordings that are played upon actuation of the respective actuator devices 240, 242, 244, 246, and 248. As an example and not a limitation, a purchaser of the package 200 may intend to give the package 200 to a giftee. The purchaser (or other person) may record a personal audio message on one of the audio non-visual message elements 220-224 (e.g., using a programming mode) to be played back by the giftee when unboxing the package 200.

An example, non-limiting unboxing experience will now be described with reference to FIG. 8. It should be understood that embodiments are not limited to the particular example unboxing experience described below.

Referring to FIG. 8, a user (e.g., a visually impaired or blind user) may pick up the package 200 with his or her hands and find audio non-visual message elements 220 and 221. Actuation of actuator devices 240 and 242 may produce auditory signals that provide an overview or general description of the product enclosed by the package 200 and/or musical accompaniment to set the mood for the unboxing experience. For example, audio non-visual message element 221 may provide information regarding where the tab is located to lift the top wall 106 of the package 200 to expose the interior region of the package 200, while audio non-visual message element 220 may play music.

After opening the package 200, the sub-component packages 110A-110C and audio non-visual message elements 222-224 are exposed and accessible to the user. It is noted that in some embodiments, a loose substrate 108 as depicted in FIG. 2 may be disposed within the package 200. The tactile non-visual message 109 provided on loose substrate 108 may have instructed the user to find the left-most sub-component package 110A first. As an example, the left-most sub-component package 110A may enclose the main sub-component of the product.

The user may feel the actuator device 244 of the audio non-visual message element 224 when grasping the left-most sub-component package 110A. Actuation of the audio non-visual message element 124 may provide an auditory signal regarding the sub-component enclosed by the left-most sub-component package 110A to describe the sub-component as well as build excitement for the user prior to and during opening the left-most sub-component package 110A.

Although not depicted in FIG. 8, one or more additional audio non-visual message elements (and/or tactile non-visual message elements) may be disposed within the left-most sub-component package 110A to provide additional information regarding the sub-component enclosed therein.

A similar unboxing process as described above may be provided for the remaining sub-component packages 110B and 110C, as well as any additional sub-component packages that may be enclosed. In this manner, audio non-visual message elements associated with the package may enhance the unboxing experience for visually impaired or blind users.

Figure 9:
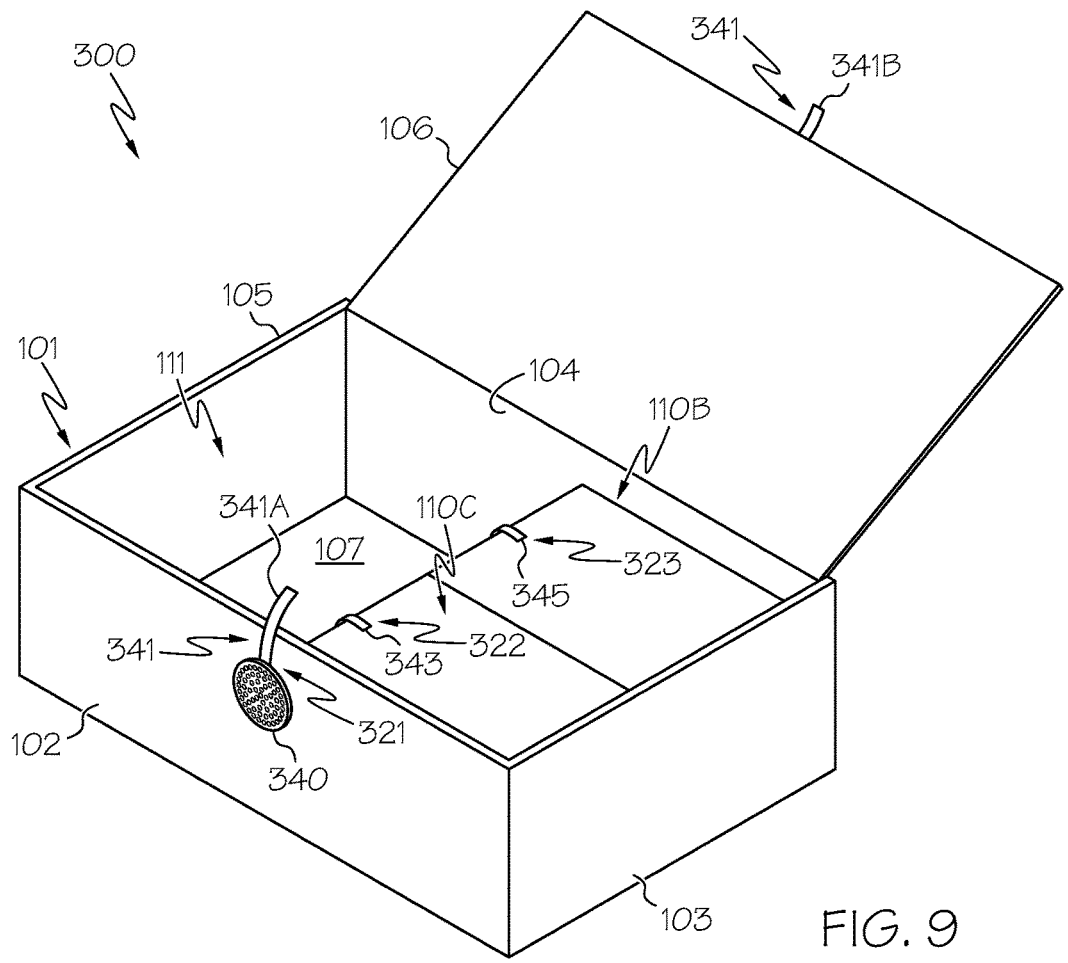
FIG. 9 schematically depicts a package with audio non-visual message elements according to one or more embodiments described and illustrated herein.
Figure 10:
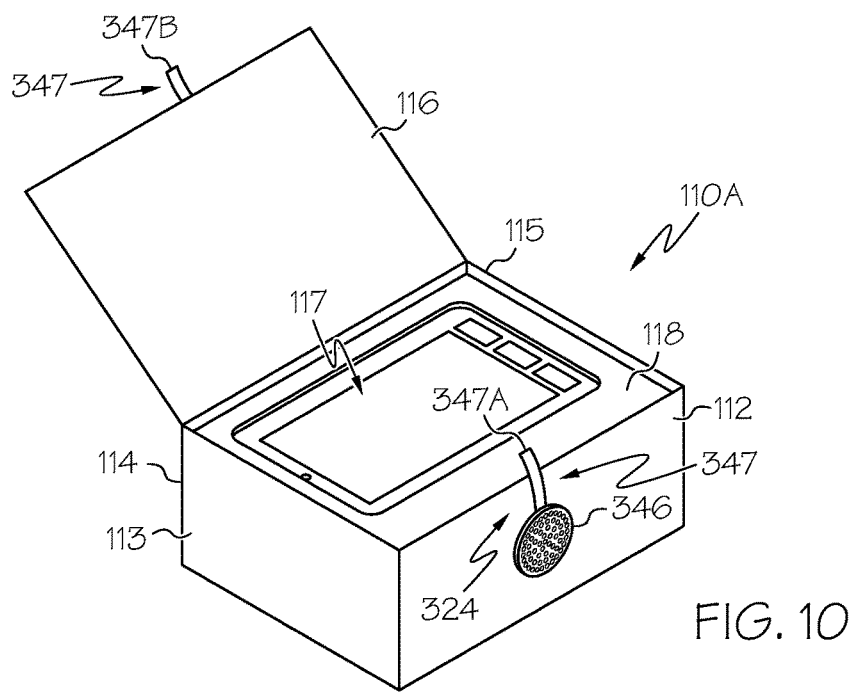
FIG. 10 schematically depicts a sub-component package with an audio non-visual message element according to one or more embodiments described and illustrated herein.

Referring now to FIGS. 9 and 10, another example of a package 300 having audio non-visual message elements is depicted. In the illustrated embodiment, an audio non-visual message element 331 is provided on the exterior surface 101 of the package at wall 102 and top wall 106. More specifically, the illustrated audio-non-visual message element 321 comprises a speaker device 340 (e.g., such as the speaker devices illustrated in FIG. 8 as described above) and an actuator device 341 that is coupled to the speaker device 340 and the exterior surface of the top wall 106. The actuator device 341 is configured as a tape or other tearable substrate that may include a loop of an electrical conductor (e.g., a thin wire or electrically conductive portions of the tape of the actuator device 341). The actuator device 341 may therefore close a switch within the speaker device 340 (or other control portion (not shown) associated with the speaker device).

As shown in FIG. 9, when the user opens the package 300 by raising the top wall 106, the actuator device 341 is torn into a first segment 341A and a second segment 341B, which causes an electrical discontinuity within the actuator device. This opens a circuit within the speaker device 340 and causes the speaker device 340 to play one or more auditory signals.

Similarly, the package 300 includes audio non-visual message elements 322, 323 and 324 associated with sub-component packages 110A-110C. FIG. 9 depicts the left-most sub-component package 110A removed from the interior region 111 of the package 300, while FIG. 10 depicts the left-most sub-component package 110A in an opened state. Lifting of the top wall 106 of the left-most sub-component package 110A causes the actuator device 347 to tear into two segments 347A and 347B and cause the speaker device 346 of the audio non-visual message element 324 to play an auditory signal (FIG. 10). It should be understood that the other audio non-visual message elements 322, 323 may operate in the same way. It is noted that actuator devices 343 and 345 are visible in FIG. 9.

Figure 11:
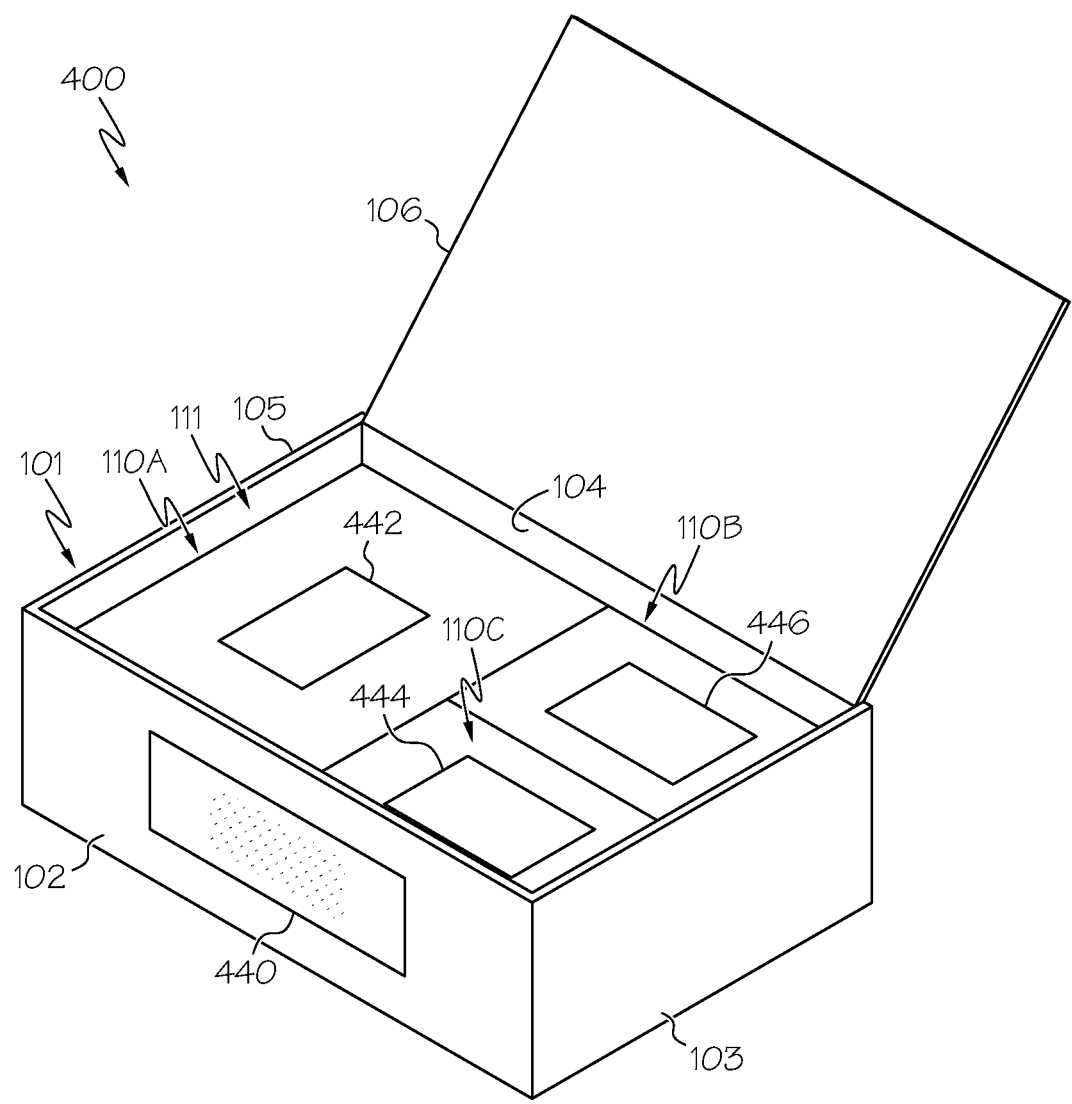
FIG. 11 schematically depicts a package with a wireless signal receiving device and a plurality of wireless signal emitter devices according to one or more embodiments described and illustrated herein.

FIG. 11 schematically depicts another example package 400 incorporating audio non-visual message elements. The example package 400 includes a speaker device 440 that also is a wireless signal receiving device (i.e., an exterior auditory message device). The speaker device 440 of the example package 400 is coupled to the exterior surface 101 of the package 400 at wall 102. As shown in FIG. 11, each of the sub-component packages 110A-110C has a wireless signal emitter device 442, 444, 446 associated therewith. The wireless signal emitter devices 442, 444, 446, which act as actuator devices, are configured to produce a wireless signal that is operable to be detected by the speaker device 440 when the wireless signal emitter device is brought into close proximity with the speaker device 440. The wireless signal emitter devices 442, 444, 446 may produce any type of wireless signal, including, but not limited to, a radio-frequency identification signal ("RFID"), a near-field communication signal ("NFC"), and BlueTooth Low Energy signal ("BlueTooth LE").

When a wireless signal emitter device 442, 444, 446 is brought into close proximity to the speaker device 440, the wireless signal is received by the speaker device 440. The received wireless signal is decoded, and the appropriate auditory signal associated with the received wireless signal is emitted by the speaker device 440. Any number of auditory signals may be stored as audio files within a memory of the speaker device 440, for example.

Any number of wireless signal emitter devices may be provided on any number of surfaces of the sub-component packages 110A-110C.

In some embodiments, the package 400 further includes one or more actuator devices (e.g., a momentary switch, a touch sensitive switch, or the like) (not shown) that causes the speaker device 440 to produce one or more auditory signals prior to the user opening the package 400.

Figure 12:
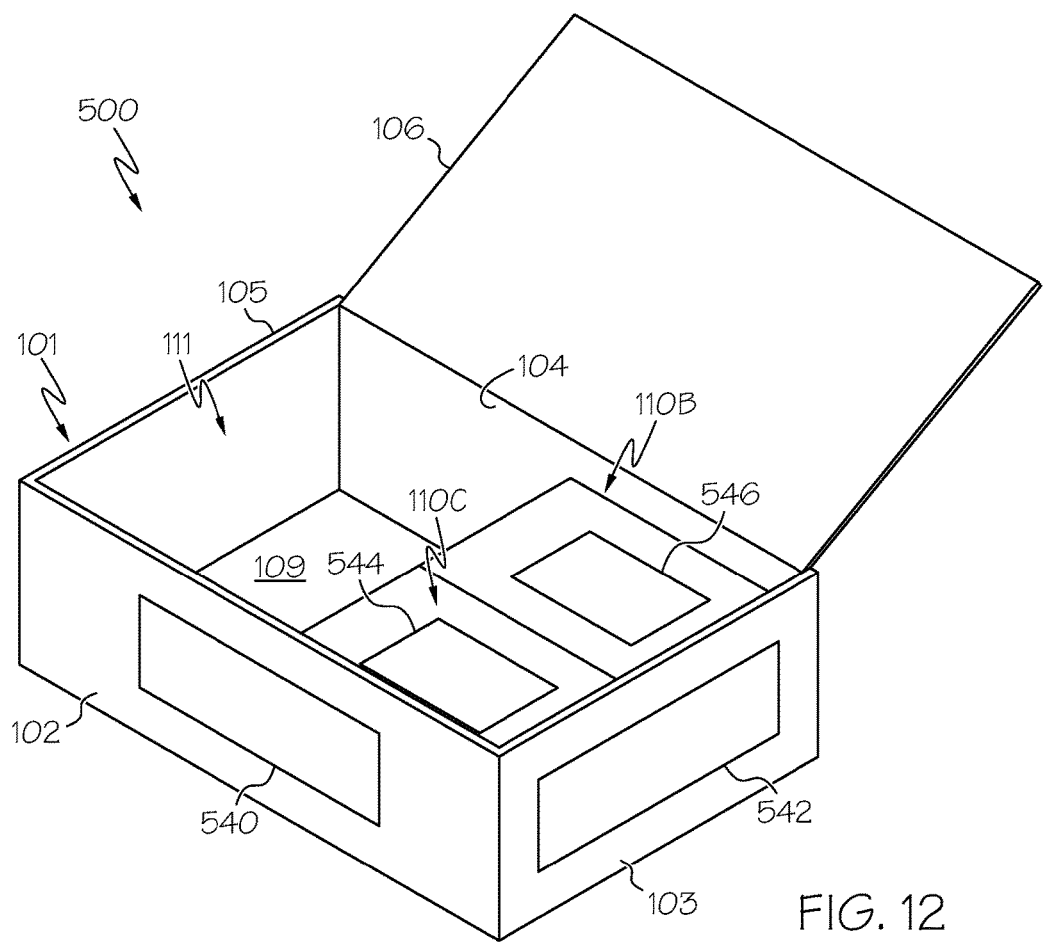
FIG. 12 schematically depicts a package with a plurality of wireless signal emitter devices according to one or more embodiments described and illustrated herein.
Figure 13:
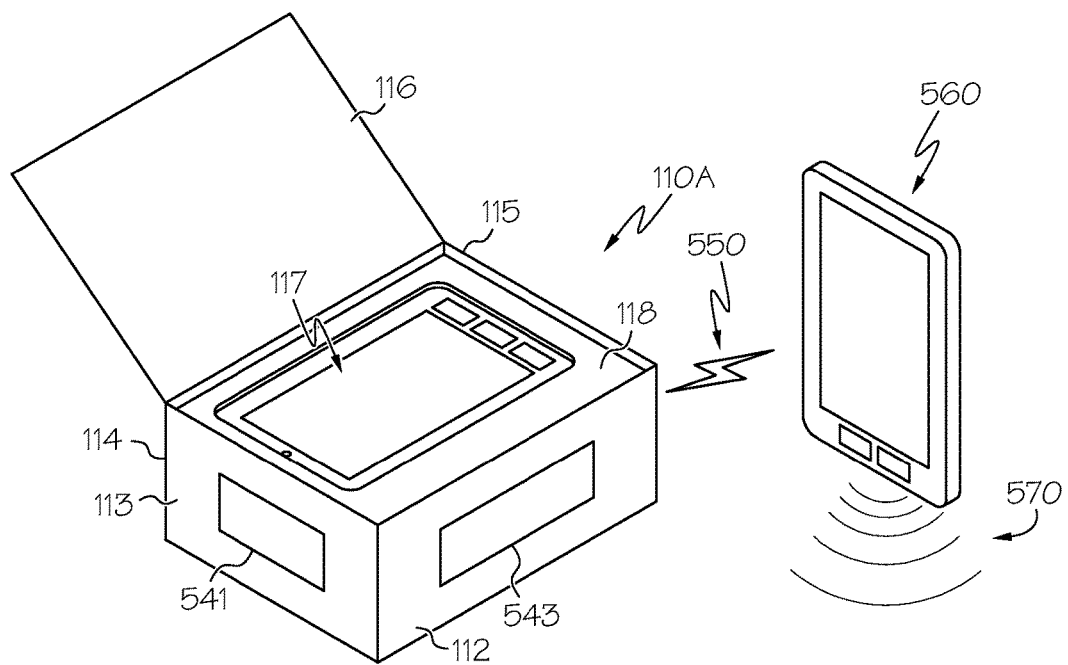
FIG. 13 schematically depicts a wireless signal emitter device of a sub-component package of the package depicted in FIG. 12 communicating with a cellular phone according to one or more embodiments described and illustrated herein.

FIGS. 12 and 13 depict another example package 500 capable of providing auditory signals to a user. In this embodiment, an external communications device 560 is used to produce the auditory signals 570 rather than speaker devices provided on the package 500 and/or various sub-component packages 110A-110C as described above. Referring to FIG. 12, the left-most sub-component package 110A (shown in FIG. 13) is removed from the interior region 101 of the package 500. A plurality of wireless signal emitter devices (e.g., wireless signal emitter devices 540, 542, 544 and 546) are disposed about the exterior surface 101 of the package 500 as well as the sub-component packages 110A-110C. Any number of wireless signal emitter devices may be provided on any number of walls of the package 500 and the sub-component packages 110A-110C.

As shown in FIG. 13, a wireless signal emitter device 541 is disposed on wall 113, and a wireless signal emitter device 543 is disposed on wall 112. Sub-component packages 110A, 110B may have similarly located wireless signal emitter devices. Although not depicted in FIG. 13, sub-component package 110A may have a wireless signal emitter device disposed on an exterior surface of top wall 106. Additionally, a wireless signal emitter device is disposed on wall 115 but is not visible in FIG. 13.

Each of the wireless signal emitter devices are configured to generate a unique wireless signal (e.g., an RFID signal, an NFC signal, a BlueTooth LE signal, and the like) that is associated with one or more auditory signals. As shown in FIG. 13, to play an auditory signal, the user may position a communications device 560 (e.g., a cellular phone capable of receiving the wireless signals) within close proximity of the wireless signal emitter device. In FIG. 13, the communications device 560 is positioned close to a wireless signal emitter device (not shown) disposed on wall 115 of the left-most sub-component package 110A. The wireless signal emitter device emits a wireless signal 550 (e.g., in response to wireless communication signals from the communications device 560 prompting the wireless signal emitter device to emit the wireless signal 550) which is received by the communications device 560. In such a manner, the wireless signal emitter device and the communications device 560 are communicatively coupled.

The communications device 560 may read the data associated with the wireless signal 550 (e.g., a unique identifier) and emit the auditory signal 570 in accordance with wireless signal 550. The auditory signals associated with the various wireless signal emitter devices may provide any of the messages and/or music/sounds described hereinabove.

In some embodiments, one or more of wireless signal emitter devices (e.g., wireless signal emitter devices 540, 541, 542, 543, 544 and 546 of FIGS. 12 and 13, or wireless signal emitter devices 442, 444, and 446 of FIG. 11) may have tactile non-visual messages embedded thereon. These tactile non-visual messages may provide any type of information, such as to the presence of a wireless signal emitter device, or instructions as to how to play the auditory signals using the wireless signal emitter device.

It should now be understood that embodiments described herein enhance an unboxing experience for visually impaired or blind users by incorporating non-visual message elements in the packaging. Non-visual message elements may include tactile and/or audio non-visual message elements that enhance the unboxing experience for the user by building excitement as various layers of the packaging are unboxed while also providing useful information to the user regarding the product and its sub-components.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A package comprising:
an exterior surface including a lid that is adjustable between an open and a closed position;
an exterior non-visual message element disposed on the exterior surface;
a first sub-component package, and a second sub-component package, wherein the first sub-component package and the second sub-component package are enclosed by the exterior surface in an interior region of the package;
a first non-visual message element associated with the first sub-component package, wherein the first non-visual message element is disposed on a top surface of the first sub-component package, the top surface facing the lid when the lid is in the closed position; and
a second non-visual message element and a third non-visual message element associated with the second sub-component package, wherein:
the second non-visual message element and the third non-visual message element provide tactile messages, the second non-visual message element is configured as a Braille message, and
the third non-visual message element is configured as a textured surface indicative of a proximity of the Braille message of the second non-visual message element and defining an enclosed perimeter, wherein the enclosed perimeter does not include and does not surround the Braille message, and
the third non-visual message element is further configured as an embossed directional shape indicative of a proximity of the Braille message of the second non-visual message element and defining an enclosed perimeter that does not include and does not surround the Braille message, wherein the embossed directional shape comprises an arrow pointing toward the Braille message of the second non-visual message element.

2. The package of claim 1, wherein the first non-visual message element is positioned on an exterior surface of the first sub-component package, and the second non-visual message element is positioned on an exterior surface of the second sub-component package.

3. The package of claim 1, wherein the first sub-component package and the second sub-component package are hierarchically arranged and stacked within the interior region of the package, such that the first sub-component package is provided in a first layer within the interior region of the package and the second sub-component package is provided in a second layer within the interior region of the package, wherein the first layer is disposed on a first vertical-level and the second layer is disposed on a second vertical level one of above or below the first vertical level in the interior region.

4. The package of claim 3, further comprising a substrate enclosed by the exterior surface, the substrate comprising an additional non-visual message element describing aspects of at least a first sub-component and a second sub-component.

5. The package of claim 1, further comprising one or more non-visual message elements disposed within an interior region of the first sub-component package and/or the second sub-component package.

6. The package of claim 1, wherein the first non-visual message element and the second non-visual message element provide a tactile message, an auditory signal, or combinations thereof.

7. The package of claim 1, wherein the first non-visual message element provides one or more tactile messages.

8. The package of claim 7, wherein the one or more tactile messages are configured as Braille messages.

9. The package of claim 7, wherein the one or more tactile messages are configured as embossed shapes.

10. The package of claim 1, wherein one or more of the first non-visual message element and the second non-visual message element comprises a speaker device and an actuator device, wherein actuation of the actuator device causes the speaker device to produce one or more auditory signals.

11. The package of claim 10, further comprising an exterior auditory message device comprising an external speaker device.

12. The package of claim 10, wherein the actuator device comprises a switch.

13. The package of claim 1, wherein the first non-visual message element and/or the second non-visual message element comprises a wireless signal emitter device operable to produce a wireless signal.

14. The package of claim 1, wherein the textured surface comprises at least one of a rough texture, a fuzzy texture, a scaly texture, and a smooth texture.

15. A package comprising:
an exterior surface;
a first sub-component package, wherein the first sub-component package is enclosed by the exterior surface in an interior region of the package;
a first wireless signal emitter device and a second wireless signal emitter device, wherein each of the first and second wireless signal emitter devices is configured to emit a wireless signal that is encoded and associated with an associated auditory signal, and at least the first wireless signal emitter device is disposed on the first sub-component package and the second wireless signal emitter device is disposed on one of the first sub-component package and the exterior surface of the package; and
a wireless signal receiving device comprising a speaker device coupled to, as an attached electrical structural component of, the exterior surface, wherein the wireless signal receiving device is operable to:
receive the wireless signal emitted by the first or second wireless signal emitter device;
decode the wireless signal; and
produce one or more associated auditory signals in accordance with the wireless signal emitted by the first or second wireless signal emitter device upon receipt and decoding of the wireless signal.

16. The package of claim 15, wherein the first and second wireless signal emitter devices are operable to produce wireless signals such that the wireless signals are received by an external communications device.

17. The package of claim 16, wherein the external communications device is a cellular phone.

18. A package comprising:
an exterior surface including a lid that is adjustable between an open and a closed position;
an exterior non-visual message element disposed on the exterior surface;
a first sub-component package, and a second sub-component package, wherein the first sub-component package and the second sub-component package are enclosed by the exterior surface in an interior region of the package;
a first non-visual message element associated with the first sub-component package, wherein the first non-visual message element is disposed on a top surface of the first sub-component package, the top surface facing the lid when the lid is in the closed position; and
a second non-visual message element and a third non-visual message element associated with the second sub-component package, wherein:
the second non-visual message element and the third non-visual message element provide tactile messages, the second non-visual message element is configured-as a Braille message, and
the third non-visual message element is configured as an embossed directional shape indicative of a proximity of the Braille message of the second non-visual message element and defining an enclosed perimeter, wherein the enclosed perimeter does not include and does not surround the Braille message, and the embossed directional shape comprises an arrow pointing toward the Braille message of the second non-visual message element.

\* \* \* \* \*